SUPERCONDUCTING TUNNELING DEVICES WITH IMPROVED IMPEDANCE MATCHING TO RESONANT CAVITIES

Filed June 29, 1966 2 Sheets-Sheet 1

INVENTORS A. H. DAYEM
C. C. GRIMES
BY George S. Indig
ATTORNEY

United States Patent Office 3,386,050

Patented May 28, 1968

3,386,050

SUPERCONDUCTING TUNNELING DEVICES WITH IMPROVED IMPEDANCE MATCHING TO RESONANT CAVITIES

Aly H. Dayem, New Providence, and Charles C. Grimes, Berkeley Heights, N.J., assignors to Bell Telephone Laboratories, Incorporated, Berkeley Heights, N.J., a corporation of New York Filed June 29, 1966, Ser. No. 561,517
13 Claims. (Cl. 331—101)

ABSTRACT OF THE DISCLOSURE

Two-particle superconducting tunnel structures such as those operating in accordance with the Josephson principle show improved oscillator efficiency when placed at a low impedance portion of a resonant cavity so that the R.F. currents of the cavity travel through the tunnel structure.

This invention relates to circuit elements operating over the electromagnetic wave frequency range of from 10 gigacycles per second to 1000 gigacycles per second. Elements of this invention may be utilized as oscillators and detectors, inter alia.

In an article in Physics Letters for July 1962 (1 Physics Letters 251), B. D. Josephson postulates a two-particle tunneling mechanism for the case of two superconductors separated by a thin dielectric layer. Accompanying effects and verifying experiments are described by Mr. Josephson in that and succeeding papers. The effect was to open up a whole new field both of scientific and of technological pursuit.

One of the more significant accompanying phenomena has been named the A.C. Josephson effect. It was predicted that R.F. currents at frequencies readily calculated to lie in the millimeter and submillimeter range would accompany two-particle tunneling. Experimental evidence for these A.C. emanations in the form of steps in the I–V characteristic curve were shortly forthcoming. Direct observation of the high frequency radiation has been more recent. See Russian reference: I. K. Yanson, V. M. Svistunov, and I. M. Dmitrenko, Zhurnal Eksperimentalnoi i Teoreticheskoi Fiziki (USSR), vol. 48, 976 (1965) [Translation: Soviet Physics-JETP 21, 650 (1965)].

Unfortunately, the A.C. emanations, while indisputably observed, have been measured at power levels no higher than $10^{-12}$ watt. Since power input to the device over the frequency range at which the measurements were made was of the order of $10^{-7}$ watt, the device was operating at an efficiency of 0.001 percent. Nevertheless, since there are no efficient oscillators operating over at least part of the designated range of from 10 gigacycles to 1000 gigacycles per second, there is substantial interest in the device.

Direct measurements of A.C. Josephson radiation have utilized the fundamental dielectric sandwich structure placed in a waveguide. The characteristic impedance of the high field strength portion of a typical waveguide structure is of the order of 100 ohms. The characteristic impedance of the Josephson tunnel structures utilized is about $10^{-3}$ ohm. In large part, the inefficiency of the device can be attributed to this impedance mismatch. The problem of substantially matching the very low impedance radiator to the necessarily high impedance waveguide is considered substantial. It is unlikely that any appreciable improvement will be made with this structural approach.

In accordance with the present invention, a different structural approach is presented for elements utilizing the A.C. Josephson effect. Treating the device as a low impedance voltage or current source, the junction is placed in a resonant cavity in such manner as to cause the circulating R.F. currents to travel through a circuit defined by the cavity and the junction. In this fashion, the junction is made to operate as a conductive element rather than as a radiator. It may, therefore, be placed in a low impedance region within the cavity, for example, close to a conducting wall in a half wave structure, so that near perfect impedance matching may be achieved. Since the diode is no longer being treated as an antenna the fact that the electric field strength is very low in the region of the cavity in which it is placed is irrelevant.

While the original Josephson observations were concerned with a sandwich of two superconducting members separated by an extremely thin dielectric layer, subsequent studies have resulted in the observation of similar effects in bridge configurations. See 13 Physical Review Letters 195 (1964).

It is well known that there are no fundamental differences between the A.C. effects observed in dielectric junctions and bridges. The main difference between the two phenomena is the absence of single particle or normal superconducting tunneling in the bridge structure, so that no evidence is found for such an energy gap in the I–V characteristic. Absence of single particle tunneling is, of course, of no consequence in the practice of this invention so that the two types of structures are here considered in every way equivalent.

Where use is made of the term "junction" in the description of this invention, it is to be understood that the term encompasses bridge-type structures in which there is metal-to-metal contact, whether between two bodies or within a single body, as well as the original Josephson type structure in which superconducting elements are separated by a dielectric layer.

Recent studies have indicated that the line between the dielectric-type structure and the bridge-type structure is not always sharp. In general, it is noted that since single particle tunneling can occur only across a dielectric layer, bridge-type structures show no structure around the single particle energy gap in the I–V characteristic. It has been shown, however, that adjustment of point type contacts can result either in well-defined energy gap structure corresponding to a dielectric sandwich, or in no structure whatever, indicating bridge characteristics. The characteristics intermediate are, however, a continuum, with structure gradually growing as pressure is decreased. It may, therefore, be assumed that for intermediate pressures in this type of structure, and under other conditions for certain other structures, the phenomena may be simultaneous. Such mixed structures are, of course, suitable for the operation of this invention.

Any of the foregoing structures, whether they include dielectric layers, whether they are bridges, whether they are made up of two points or of one point and a flat or a curve, are to be considered within the scope of the invention.

In accordance with a preferred embodiment herein, use is made of a superconducting bridge produced by bringing together two members, at least one of which is pointed, with sufficient pressure to realize bridge-type characteristics. This structure, utilizing a cylindrical pointed member, is most advantageously placed coaxially within a cylindrical cavity. In common with all other embodiments of this invention, the point contact is made an integral part of the path for the circulating R.F. currents.

The invention is described largely in terms of oscillators, and it is to this aspect that the greatest scientific and technological attention will be directed. The described configurations are, however, useful for other purposes, some of which have already been described, to which other Josephson devices may be applied. For example, used as a detector, the devices of this invention are useful for measuring emanations over the frequency range described at levels of $10^{-12}$ watt and lower.

Further description of the invention is expedited by reference to the drawing, in which.

Figure 1:
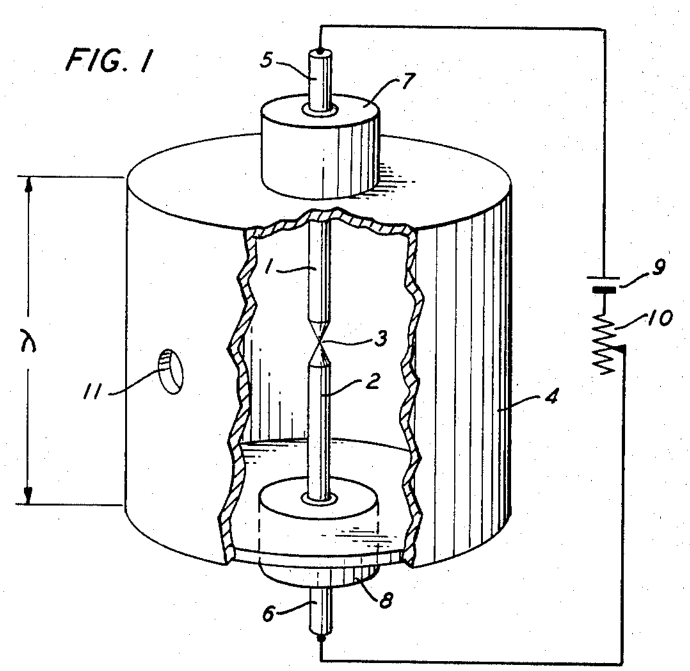
FIG. 1 is a perspective view partly in section of a structure including a full wave cavity.

Referring again to FIG. 1, the bridge or tunnel junction is produced between superconducting members 1 and 2, making point contact either directly or through a dielectric layer at their interface 3. The junction forms part of a coaxial cavity with member 4, which is constructed so as to have a height of one or more full wavelengths in the dimension indicated and so as to resonate in the TEM mode at the design frequency. Interface 3 is at the approximate center of the full wave cavity (or at a node in a multiple-wave structure), which position defines a low impedance region. Leads 5 and 6 are brought out of the cavity through choke sections 7 and 8, and the desired voltage is applied by means of bias source 9 and potentiometer 10. Coupling is achieved by means of a probe, not shown, or an iris 11. Not shown is a cooling means sufficient to reduce the temperature of conducting members 1 and 2 to below their superconducting transition point.

Point contacts such as members 1 and 2 of FIG. 1 may be machined, cast, or etched. Both contacts can be pointed, as depicted, or one can be flat or round. The sharpness of the pointed contact is not critical for operation. It may be so fine as to define an interface of a fraction of a square micron or so blunt as to produce an interface of a few thousand square microns. However, closest impedance matching generally requires a minimization of capacitance, that is a minimization of cross-sectional area at the interface to maximize the impedance of the junction. Such considerations often result in a preferred interfacial area of the order of a few square microns or smaller.

To operate as an oscillator, an increasing voltage is applied across the leads 5 and 6. The resulting I–V characteristic manifests constant voltage steps of the type which have been shown in the literature for previous Josephson structures, with the steps occurring at voltages which satisfy the Josephson relationship for the resonant frequency of the cavity. The desired biasing voltage is then simply chosen to correspond with the desired frequency. This represents a departure from previous structures in which the observed steps have corresponded with the resonances of the junction itself.

To operate efficiently, the pressure applied to the point contact may then be varied so as to maximize the measured output. This adjustment may be accomplished by use of a simple system of levers not shown which allow one of the point contacts to be moved while the device is at its operating temperature. Similar lever systems have been used to tune millimeter wave reflex klystrons.

Further refinements in structures such as that of FIG. 1 may include adjustment to position the interface 3 so as to optimize impedance matching to the cavity. To achieve maximum output, the contact pressure at operating temperature and the junction position may then be adjusted while monitoring the output of the device.

The millimeter or submillimeter wave oscillator described in conjunction with FIG. 1 represents one possible form of the invention. Other forms are described briefly below.

Figure 2:
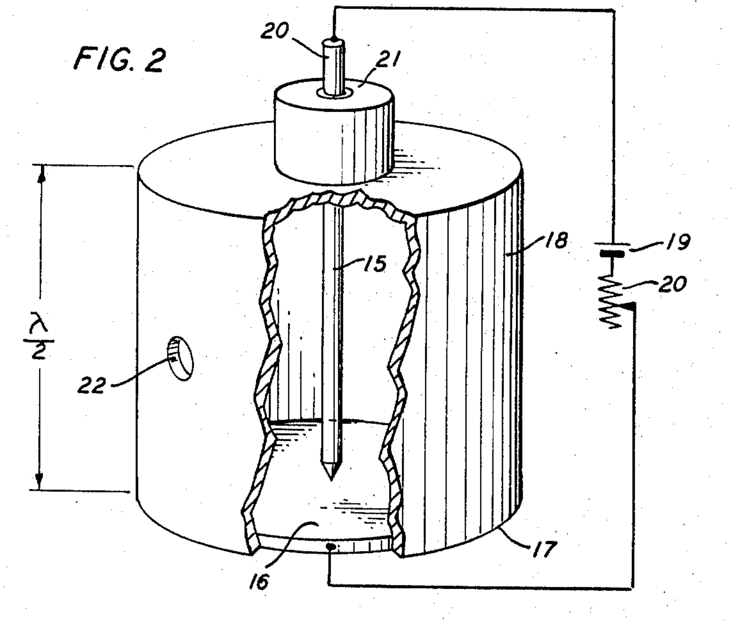
FIG. 2 is a perspective view partly in section of a half wave cavity device.

The device of FIG. 2 is similar to that of FIG. 1 but utilizes a half wavelength coaxial cavity. The low impedance position in the axial direction is in this instance close to an end wall. The pointed superconducting element 15 makes contact with superconducting flat 16 adjacent end wall 17 of outer member 18. Direct current bias is achieved by means of bias source 19 and potentiometer 20 which are electrically connected to lead 20 and end plate 17, so biasing the junction. Energy loss is minimized by means of choke section 21 and energy is coupled out through coupling hole 22. In common with the other structures described herein, means are desirably included for adjusting the junction at the interface between elements 15 and 16. Again, the means may constitute levers as discussed in conjunction with FIG. 1. As in the other devices discussed, the junction may include an interposed dielectric layer as originally described by Josephson or may constitute a conducting bridge as described by Anderson and Dayem.

Figure 3:
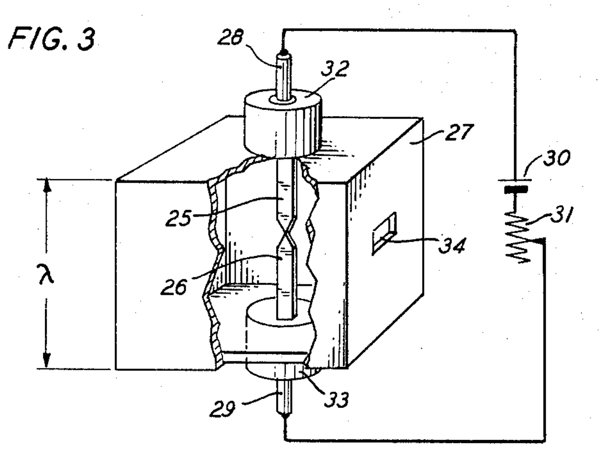
FIG. 3 is a perspective view partly in section of another full wave cavity device.
Figure 4:
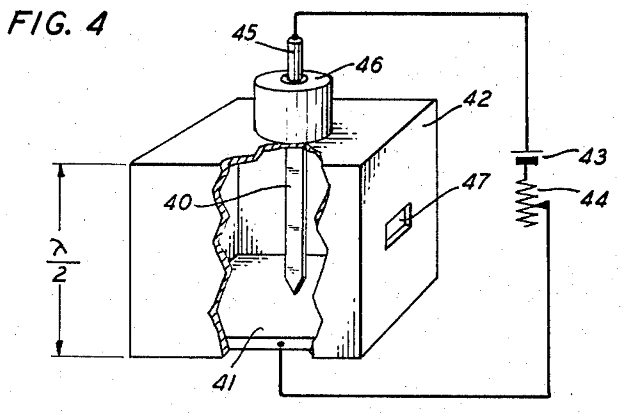
FIG. 4 is a perspective view partly in section of a half wave device alternative to that of FIG. 2.

FIGS. 3 and 4 are TEM mode devices directly analogous to those of FIGS. 1 and 2. The difference between the two classes of devices is largely physical, FIGS. 3 and 4 representing rectilinear rather than circular designs. Again, the structure consists of superconducting members 25 and 26 forming a dielectric sandwich or bridge at their interface within cavity 27. Leads 28 and 29 are electrically connected to bias source 30 and potentiometer 31 and are brought into cavity 27 through choke sections 32 and 33. Energy may be coupled out through coupling hole 34. Since this is a full wavelength TEM mode device, the junction may again be placed at the approximate center of the cavity, so as to realize a low matching impedance.

The device of FIG. 4 is a half wave TEM mode structure provided with superconducting point electrode 40 defining a junction with superconducting flat 41 in a low impedance region (near an end wall) within cavity 42. Biasing is achieved by means of bias source 43 adjusted to value by potentiometer 44 in turn connected to flat 41 and lead 45, the latter making contact with superconducting element 40 through choke 46. Output circuitry not shown makes use of coupling hole 47.

Figure 5:
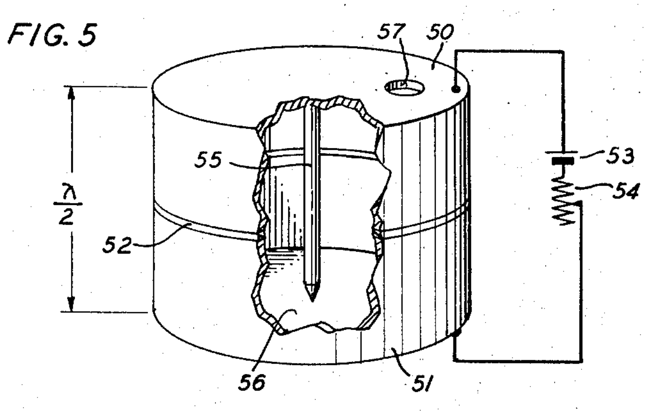
FIG. 5 is a perspective view partly in section of another device utilizing the principles herein.

The device of FIG. 5 is a half wavelength circular coaxial cavity differing from that of FIG. 2 in that the cavity is made up of two halves or two sections, 50 and 51, electrically insulated one from the other by dielectric member 52. This expedient permits direct bias again by means of bias source 53 and potentiometer 54 across the two cavity sections, so eliminating the need for choke sections. The functional element is a pointed superconducting member 55 which forms a junction with superconducting plate 56. Coupling out is achieved with coupling hole 57. The configuration of FIG. 5 has the advantage of simplicity but does complicate adjustment of contact pressure.

It will be recognized by anyone familiar with cavity technology that the five figures are merely exemplary. Modes other than TEM are, of course, suitable. Certain structures have been defined. Others using the same and other modes are, of course, equally suitable. While the point type device is particularly suitable for use in a coaxial cavity configuration, other types of dielectric or bridge structures may be substituted, so long as the major requirement of the inventive teaching is followed, that is the junction or bridge so arranged as to conductively excite a cavity must be placed in a low impedance region within the cavity. Placement at such high current density point suggests that the junction or bridge is being used as a conductive element (in the R.F. sense) rather than as a radiator, and it is on this conceptual difference that the invention is premised.

It is well known that the Josephson frequency is a function of the voltage. It is fundamental that for the type structures suitable for use in accordance with this invention power input is of the order of $10^{-7}$ watt, so that even for a device operating at one hundred percent efficiency, the output is no higher. Various techniques may be used to increase this output. An obvious approach is to utilize several structures in parallel, as, for example, by use of separate junctions. Another approach is to contact two "rough" surfaces, so that contact is actually point to point. Difficulty with such structure is introduced by the fact that point spacings, and therefore optimum resonance points, are not independently adjustable. This difficulty can be circumvented by separate construction of various of the parallel elements or by machining techniques that assure equal spacing at the random point contacts of the two flats.

In a bridge structure which is constructed from a unitary body, whether film or solid, the current for any given frequency is dependent upon the cross-sectional area at the constricted portion of the bridge. Use of this structure may permit a substantial increase in both input and output current. Use of film-type structures, since they do not inherently lend themselves to use in coaxial cavities, may require certain innovations to assure most efficient R.F. circuitry. Coaxial circular device structures may be retained if two or more bridges are printed in parallel fashion on a cylinder which then serves as the center conductor. An alternative structure utilizes a film about the entire periphery of the post with a decreased film thickness region defining a ring at a desired position.

Placement of the junction axially within a cavity is an obvious means of accomplishing the structural desideratum described. Since, however, all that is required is placement at a low impedance position in the R.F. circuit, other positioning is suitable. For example, the junction or junctions may be placed in the outer wall of a coaxial cavity. FIG. 5 may be considered as representing such a structure, with layer 52 in this instance being a series of parallel junctions rather than a dielectric layer. Of course, the need for the junction defined at the interface of elements 55 and 56 is eliminated.

The invention is considered to inhere in arrangement of the Josephson junction in a cavity circuit so that the junction becomes part of the circulating R.F. current path, that is, so that all of the circulating R.F. current necessarily passes through the junction. In contrast with prior arrangements, in which the junction was treated as an antenna or radiator, it is a requirement of this invention that the junction be placed in a low impedance region of the circuit. This requirement arises in part from a desire to impedance match the "conductive" junction and is, of course, not suitable for use of the device as a radiator. Use as a radiator requires placement in a high electrical field strength region of the circuit, it being the nature of such circuitry that this region be one of relatively high impedance.

It has been indicated that for simplicity the invention is described largely in terms of use of the structures as oscillators. The inventive structures are not restricted to such use. It has been indicated that they may serve as extremely sensitive detectors, with detection frequencies being set in the same manner as oscillation frequencies. Still other uses may take advantage of parametric principles, may achieve mixing, amplification, etc.

In conjunction with FIG. 1, a technique for the fine adjustment of junction impedance to cavity impedance was described. While this technique does result in optimum performance and may, in fact, be adapted in commercial devices, other devices may make no provision for such adjustment. In a production line facility, junctions may be produced in which diode impedance is already closely matched to that of the cavity, it remaining only to set the requisite voltage to produce the desired frequency in operation.

What is claimed is:

1. Device consisting essentially of a structure exhibiting a Josephson current within a resonant cavity, the structure being so positioned in a relatively low impedance portion of the cavity so that (1) the impedance of the cavity portion approaches that of the structure and (2) the structure constitutes an R.F. conductive circuit with the cavity.

2. Device of claim 1 in which the said structure includes two superconducting elements spaced one from the other by a dielectric layer.

3. Device of claim 1 in which the said structure consists essentially of two superconducting members, at least one of which is pointed, and in which the active portion of the structure is defined by the region common to the point and the other element.

4. Device of claim 3 in which both of the said superconducting elements include points, and in which the active region is defined between two said points.

5. Device of claim 3 in which contact between the two said elements defines a conducting path.

6. Device of claim 3 in which there is a dielectric layer intermediate the two said elements.

7. Device of claim 1 in which the said cavity is coaxial.

8. Device of claim 7 in which the said structure is axially disposed within the cavity.

9. Device of claim 8 in which the said cavity is a half wavelength in axial length and in which said structure is in the region of an end wall in the said cavity.

10. Device of claim 8 in which the said cavity is a wavelength long in its axial dimension and in which the said structure is in the approximate center of the axis.

11. Device of claim 1 in which the said structure has two associated electrical leads which pass through and are electrically insulated from the outer wall of the cavity.

12. Device of claim 1 in which the said structure has two associated leads which are conductively connected each to a different section of the cavity and in which the different sections are D.C. insulated from each other.

13. Device of claim 1, together with bias means for producing an R.F. Josephson current within the said structure.

References Cited

P. W. Anderson: "Radio-Frequency Effects in Superconducting Thin Film Bridges," Physical Review Letters, vol. 13, Aug. 10, 1964, pp. 195–197.

M. E. Hines: "High-Frequency Negative-Resistance Circuit Principles for Esaki Diode Applications," The Bell System Technical Journal, May 1960, pp. 482–485.

I. Kuru: "Frequency Modulation of the Gunn Oscillator," Proceedings of the IEEE, October 1965, pp. 1642–1643.

D. N. Langenberg et al.: "Investigation of Microwave Radiation Emitted by Josephson Junctions," Physical Review Letters, vol. 15, Aug. 16, 1965, pp. 294–297.

S. Shapiro: "Josephson Currents in Superconducting Tunneling: The Effect of Microwaves and Other Observations," Physical Review Letters, vol. 11, July 15, 1963, pp. 80–82.

ROY LAKE, *Primary Examiner.*

S. H. GRIMM, *Assistant Examiner.*